Figure 2:
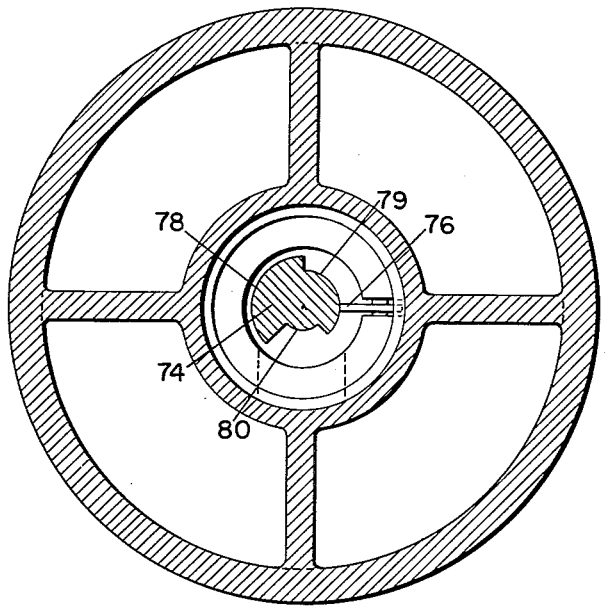

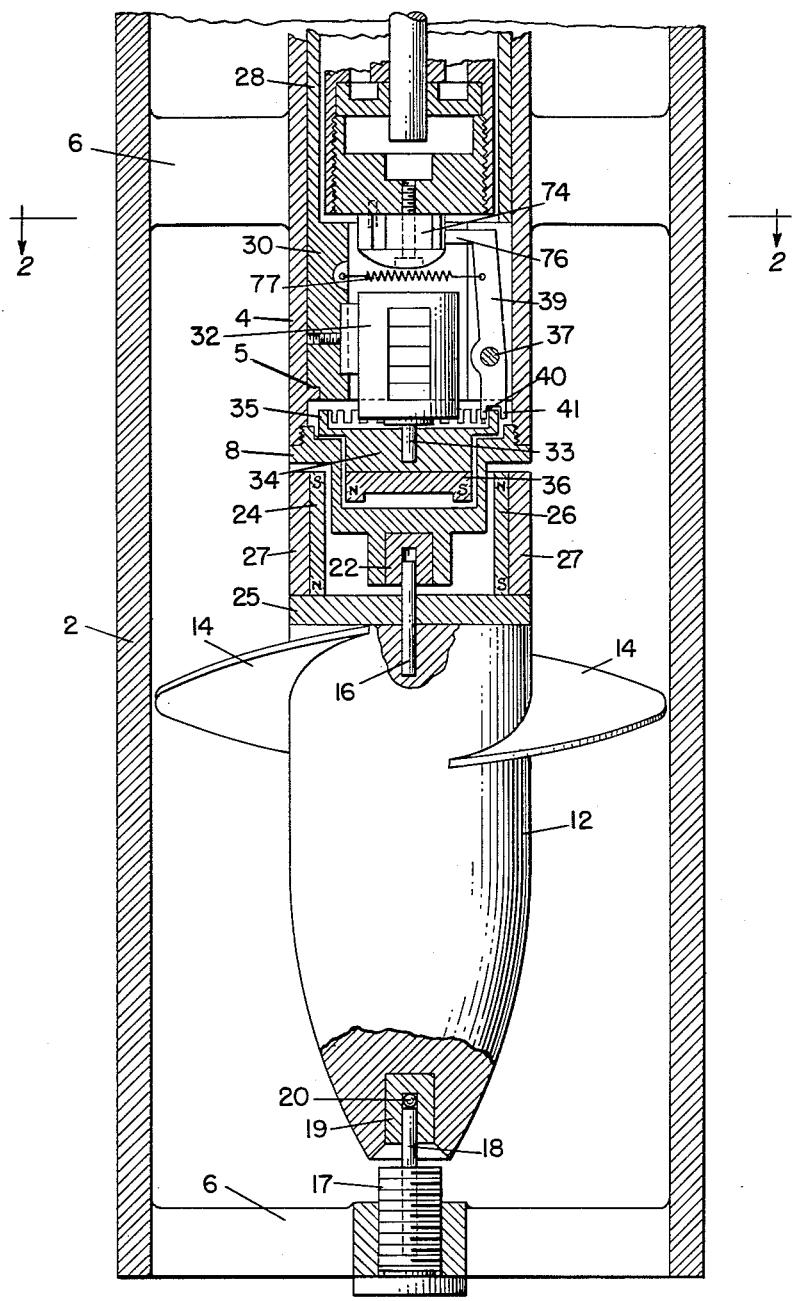
FIG. IA.
INVENTORS.
GILBERT J. BUTTERWORTH
& STEPHEN W. GURASICH
BY
ATTORNEYS

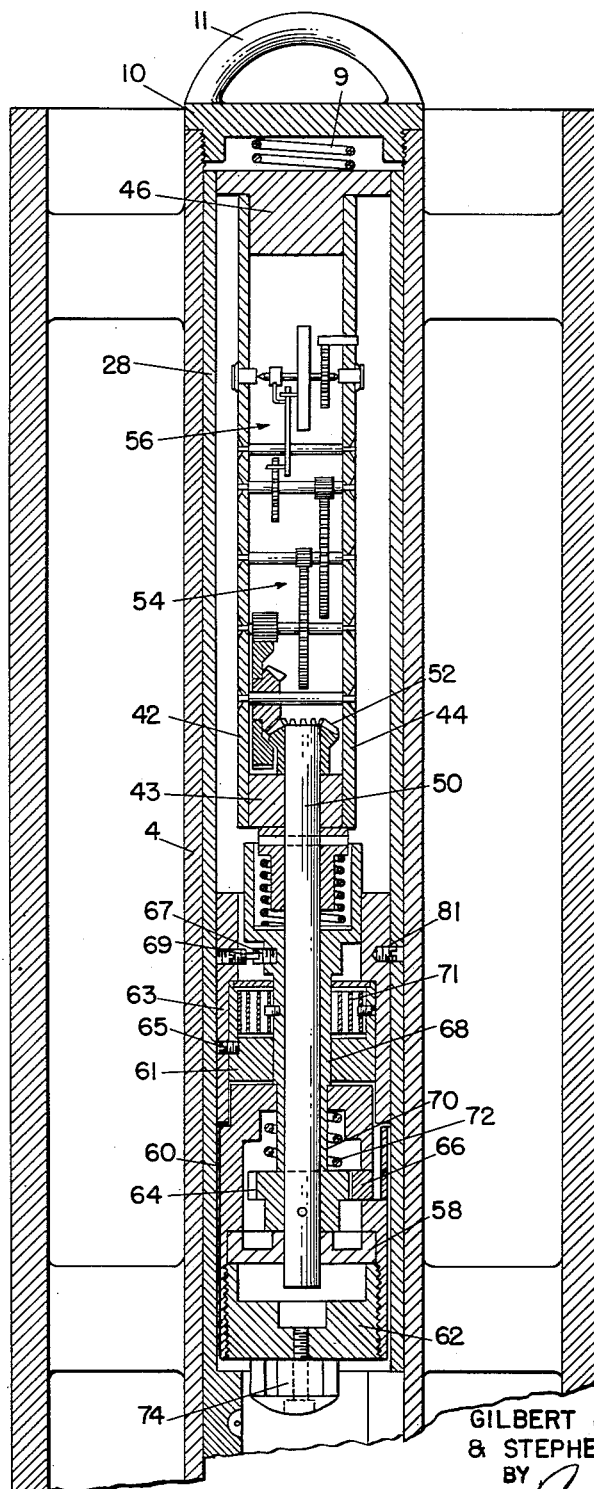
FIG. IB.
INVENTORS.
GILBERT J. BUTTERWORTH
& STEPHEN W. GURASICH
BY
ATTORNEYS July 19, 1955   G. J. BUTTERWORTH ET AL   2,713,261
SELF-CONTAINED FLOWMETER Filed Oct. 2, 1951   3 Sheets-Sheet 3

INVENTORS.
GILBERT J. BUTTERWORTH
& STEPHEN W. GURASICH
BY
ATTORNEYS

United States Patent Office 2,713,261
Patented July 19, 1955

2,713,261

SELF-CONTAINED FLOWMETER

Gilbert J. Butterworth, Chester, and Stephen W. Gurasich, Springfield, Pa., assignors to Sperry-Sun Well Surveying Company, Philadelphia, Pa., a corporation of Delaware Application October 2, 1951, Serial No. 249,332

4 Claims. (Cl. 73—155)

This invention relates to well testing apparatus and more particularly to a self-contained flowmeter for measuring the subsurface flow of liquid in a well.

In obtaining crude petroleum, the pressure within the producing horizon usually decreases so that it is necessary to cause oil flow to adjacent wells by introducing water under pressure to the oil bearing strata through former oil wells selected near the producing field. In some fields, water-bearing sands which overlie the oil strata are the source from which water is permitted to flow downwardly into the oil reservoir to create the necessary pressure by building up a hydrostatic head proportionate to the depth of the water in the field. The water flow used to create pressure in the oil-bearing strata must be carefully measured to avoid over-flooding of the oil fields, and, consequently, losing the oil residue.

There are also numerous producing wells from which the flow of oil emerges at a relatively slow rate. There are also wells in which water is rising upwardly through the well from a water-bearing stratum to any overlying oil-bearing stratum. In these two types of wells it is frequently desirable to measure the flow of liquid, water or oil, rising in the well.

It is an object of the present invention to provide a portable apparatus which may be lowered into a well and which will measure the rate of liquid flow in the well.

It is a further object of this invention to provide an apparatus which may be lowered into a well and provide a measurement of liquid flow therein without necessitating the use of any apparatus permanently mounted within the well.

The present apparatus is particularly adaptable to measuring relatively small rates of flow in that wells having low flow rates of either oil or water generally do not warrant the installation of permanent apparatus for providing flow measurement.

These and other objects of the invention will become apparent from the following description, when read in conjunction with the accompanying drawings, in which:

Figures 1A and 1B are, respectively, longitudinal sections through the lower and upper portions of a flow meter embodying the invention; and Figure 2 is a radial section taken on the plane 2—2 of Figure 1A.

Referring to Figures 1A, 1B and Figure 2, there is shown a sleeve member 2, within which is mounted a housing 4 by means of the radial fins 6. The lower end of the housing 4 is provided with a cap 8 and the upper end of the housing is provided with the cap 10. Attached to the cap 10 is a ring 11 or other suitable means to provide for attachment of a cable for lowering the apparatus into a well.

Mounted between the lower cap 8 and the lower end of the sleeve 2 is the rotatable impeller member 12 mounting the impeller blades 14. The rotatable member 12 is mounted on pins 16 and 18, the pin 18 being mounted in the bolt 17 threaded into the lower fin group 6 and provided at its upper end with a ball 20, providing an anti-friction mount for the rotatable impeller member 12 within the bushing 19. The upper pin 16 is mounted for rotation in the bushing 22 which is in turn mounted in the cap 8. It will be evident that when the assembly, including the cylinder 2, the housing 4 and the rotatable impeller member 12 are lowered into a bore hole, fluid flowing through the sleeve will act upon the impeller blades 14 and cause the impeller member to rotate.

Mounted on the upper portion of the impeller member 12 are the permanent magnets 24 and 26.

Mounted within the cylindrical housing 4 is the sleeve member 28, having at its lower end the reduced diameter portion 30 adapted to mount a counter 32. Attached to the shaft 33 of the counter 32 is the rotatable member 34. Attached to the lower face of the member 34 is the magnet 36. The cap 8 closing the lower end of the housing 4 is formed of non-magnetic material and the portion 27 of the impeller member is formed of non-magnetic material. The upper portion 25 of the rotatable impeller member is formed of magnetic material. Thus there is created a magnetic circuit through the magnet 24, the impeller member 25, the magnet 26 and the magnet 36. The magnet 36 will thus rotate when the impeller member rotates if free to do so. Each rotation of the impeller member 12 and of the magnet 36 will be registered on the counter 32.

The upper portion 35 of the rotatable member 34 is in the form of a castellated cylindrical member. Pivotally mounted on the pin 37 which is affixed to the lower portion 30 of the sleeve member 28 is the latch 39, having at its lower end a pair of downwardly extending fingers 40 and 41 adapted to pass within the castellations of the portion 35 of the rotatable member 34. The space between the fingers 40 and 41 is of sufficient width to permit the portion 35 of the member 34 to pass freely therethrough.

Mounted in the upper portion of the housing 4 is a clockwork mechanism which comprises a pair of plates 42 and 44 which, at their lower ends are secured to the member 43 and at their upper ends are secured to the member 46, the upper portion of which is adapted to engage the walls of the inner sleeve 28. A shaft 50 projects downwardly from the clockwork mechanism and is connected through bevelled gears 52 to the gear train 54 which in turn is controlled by the escapement mechanism 56.

The lower end of the shaft 50 has journalled thereon a disc 58 which is secured to knob member 60 by means of a clamp plug 62. Pinned to the shaft above the disc 58 is a gear 64 provided with teeth which are arranged to be engaged by a single tooth 66 mounted in the knob 60. Above the gear 64, the shaft 50 is surrounded by a sleeve 68 journalled thereon which is provided with a squared portion 70 extending through a corresponding square opening in the upper end of the knob 60 so that, while the sleeve and knob may be subjected to relative sliding movement, they are constrained to rotate together. A spring 72 reacts between the upper end of the knob 60 and the upper surface of the gear 64.

A housing 61 located within the member 63 and locked thereto by means of the pin 65 provides a chamber for the reception of a strong spiral spring 71, the ends of which are, respectively, anchored to the housing 61 and the sleeve 68. This spring is under initial tension serving to hold the sleeve 68 in a limiting position defined by the engagement of a pin 67 secured in the sleeve 68 with a pin 69 secured in the member 63. This clockwork mechanism has been more fully described in the patent to Roland Ring, 2,559,373, dated July 3, 1951.

Mounted on the lower face of the plug 62 is the cam member 74 which is adapted to be engaged by the extension 76 of the upper end of the lever 39. The cam 74 is provided with three surfaces 78, 79 and 80 as shown in Figure 2. When the extension 76 of the lever 39 is in engagement with the surface 79 as shown the castellated member 34 is free to rotate. However, if the portion 76 of the lever 39 is in engagement with either the surface 78 or the surface 80 of the cam 74 the lower portions 41 or 40, respectively, of the lever 39 will be drawn within one of the spaces provided by the castellation of the member 34 by the action of spring 77 which is attached to the upper end of the lever 39 and thus the member 34 will be prevented from rotating.

In order to prepare the device for operation, the upper cap 10 and the spring 9 are removed from the housing 4 and the sleeve 28 withdrawn therefrom. With the sleeve thus withdrawn, the counter 32 and its associated member 34 may be removed from the sleeve and the indications of the counter noted.

The set screw 81 is provided to position the clockwork mechanism within the inner sleeve 28 and removal of the set screw 81 permits the withdrawal of the clockwork mechanism from the sleeve 28. Setting of the clockwork mechanism is accomplished by pulling the knob 60 outwardly and rotating it until the cam 74 is in such a position that, when the parts are reassembled, the extension 76 of the lever 39 will be in engagement with the portion 78 of the cammed surface. When the knob 60 is pulled outwardly, the tooth 66 is disengaged from between the teeth of the gear 64, the spring 72 being compressed in this action. As the knob 60 is rotated, the shaft 50 may then remain stationary. The rotation of the knob causes corresponding rotation of the sleeve 68 and winding of the strong spring 71 with the movement of the stop pin 67 away from the stop pin 69. When sufficient rotation has been accomplished as described above, the knob 60 is permitted to slide upwardly under the action of spring 72 and reengagement of the gear 64 with the tooth 66 takes place.

With the clockwork mechanism thus wound, it may be started and inserted into the sleeve member 28 and positioned therein by the insertion of the set screw 81.

After the clockwork mechanism has been inserted into the sleeve 28, the counter and the castellated member 35 may be inserted into the opposite end of the sleeve, the member 35 being rotated slightly as the counter is inserted to permit the finger 76 of the lever 39 to fall within one of the castellations. After the clockwork mechanism and the counter have thus been assembled into the sleeve 28, the sleeve 28 may be lowered into the housing 34 and will come to rest upon the shoulder 5 extending within the lower end of the housing 4. The spring 9 and the cap 10 are in position on the upper end of the housing 4 thus firmly positioning the apparatus within the housing and sealing the upper end of the housing.

The flowmeter may now be lowered to a desired region within a well, the extent of the surface 78 of the cam 74 at a rate of operation of a clockwork mechanism providing sufficient time for the apparatus to be thus positioned. After the apparatus is positioned, it will be maintained in that position in which it is desired to measure a flow and as the clockwork mechanism operates the cam 74 will rotate. When the intermediate portion 79 of the cam passes below the extended portion of the lever 39, the spring 77 will draw the upper end of the lever into engagement with the surface 79 of the cam and the two extensions 40 and 41 of the lower end of the lever will straddle the castellated member 34, freeing the member 34 to rotate as a result of the magnetic coupling with the rotating impeller member 12 and the magnets mounted thereon. The member 34 will rotate for a period of time as determined by the peripheral dimension of the cam surface 79 and the rate of operation of the clockwork mechanism. At the expiration of this time, the area 80 of the surface of the cam will pass below the upper end of the lever 39 and the lever will be drawn against this portion of the cam by the action of the spring 77, thereby moving the lower portion 40 of the lever 39 within castellations of the member 34 arresting further rotation of the member 34.

The operator at the surface of the earth will by means of a stop watch be able to determine when this time has arrived and thereafter retrieve the flowmeter from the well, disassemble the flowmeter and by reading the numerals indicated by the counter, determine by means of prior calibration of the impeller the rate of flow of fluid in the well at the particular level tested.

While the apparatus may be operated without the external sleeve member shown in the drawing this member not only affords protection for the impeller but also makes possible the use of the flowmeter in casings of various sizes with results of reasonable accuracy. The invention disclosed herein provides a simple and practical means for periodically determining the flow rates either upwardly or downwardly at any locations within a well without the necessity of any apparatus being permanently installed in the well.

What is claimed is:

1. A flowmeter for determining the rate of flow of liquid through a well bore hole comprising a housing adapted to be lowered into the bore hole, an impeller, means for rotatably mounting said impeller externally of said housing in a position to be rotated by liquid flowing longitudinally through the bore hole, rotatable means within said housing, means coupling said impeller with said rotatable means, timing means within said housing, actuating means driven by said timing means, means within said housing driven by said rotatable means for registering the number of rotations of said rotatable means, and means including a member responsive to said actuating means adapted to engage and arrest rotation of said rotatable means, said member acting in response to rotation of said actuating means by said timing means to free said rotatable means for rotation only during a predetermined time interval.

2. A flowmeter for determining the rate of flow of liquid through a well bore hole comprising a housing adapted to be lowered into the bore hole, an impeller, means including said housing for rotatably mounting said impeller externally of said housing in a position to be rotated by liquid flowing longitudinally through the bore hole, rotatable means within said housing, means coupling said impeller with said rotatable means, timing means within said housing, a cam driven by said timing means, means within said housing driven by said rotatable means for registering the number of rotations of said rotatable means, and means including a member responsive to said cam adapted to engage and arrest rotation of said rotatable means, said member acting in response to rotation of said cam by said timing means to free said rotatable means for rotation only during a predetermined time interval.

3. A flowmeter for determining the rate of flow of liquid through a well bore hole comprising a sleeve, a fluid-tight housing mounted within said sleeve and spaced therefrom to permit the flow of the bore hole liquid therebetween, said sleeve and said housing being adapted to be lowered into the bore hole, an impeller rotatably mounted by said sleeve externally of said housing and within said sleeve and mounted to be rotated by liquid flowing longitudinally through said bore hole and between said sleeve and said housing, rotatable means within said housing, means including a rotatable magnetic element within said housing and a rotatable magnetic element externally of said housing in axial alignment with said first mentioned magnetic element for coupling said impeller with said rotatable means, timing means within said housing, a cam driven by said timing means, means within said housing driven by said rotatable means for registering the number of rotations of said rotatable means, and means including a member responsive to said cam and adapted to engage and arrest rotation of said rotatable means, said member acting in response to rotation of said cam by said timing means to free said rotatable means for rotation only during a predetermined time interval.

4. A flowmeter for determining the rate of flow of liquid through a well bore hole comprising a housing adapted to be lowered into the bore hole, an impeller, means including said housing for rotatably mounting said impeller externally of said housing in a position to be rotated by liquid flowing longitudinally through the bore hole, rotatable means within said housing, means coupling said impeller with said rotatable means, timing means within said housing, a cam driven by said timing means, means within said housing driven by said rotatable means for registering the number of rotations of said rotatable means, and means including a pivoted member urged by a spring against said cam and adapted to engage and arrest rotation of said rotatable means, said member acting upon rotation of said cam in response to urging of said spring to engage said rotatable means for a first predetermined time interval, then to release said rotatable means for a second predetermined time interval and thereafter to reengage said rotatable means.

References Cited in the file of this patent

UNITED STATES PATENTS

| | | |
|---|---|---|
| 501,203 | Bassett | July 11, 1893 |
| 697,492 | Kelley et al. | Apr. 15, 1902 |
| 1,521,969 | Robinson | Jan. 6, 1925 |
| 1,696,600 | Hall | Dec. 25, 1928 |
| 2,143,962 | Stone | Jan. 17, 1939 |
| 2,334,920 | Gosline et al. | Nov. 23, 1943 |
| 2,524,150 | Vincent | Oct. 3, 1950 |
| 2,529,481 | Brewer | Nov. 14, 1950 |
| 2,593,285 | Fay et al. | Apr. 15, 1952 |

FOREIGN PATENTS

| | | |
|---|---|---|
| 31,602 | France | Dec. 29, 1926 |

(1st addition to 615,298)